US006468343B1

(12) United States Patent
Pruett et al.

(10) Patent No.: US 6,468,343 B1
(45) Date of Patent: *Oct. 22, 2002

(54) ENGINEERED KAOLIN PIGMENT COMPOSITION FOR PAPER COATING

(75) Inventors: Robert J. Pruett, Milledgeville; David O. Cummings, Warthen; Anthony V. Lyons, Macon; Steven M. Fortier, Milledgeville; William L. Garforth, Sandersville; Daniel J. Panfil; Jun Yuan, both of Milledgeville, all of GA (US)

(73) Assignee: Imerys Pigments, Inc., GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/717,802

(22) Filed: Nov. 21, 2000

Related U.S. Application Data

(63) Continuation of application No. 09/359,532, filed on Jul. 22, 1999, now Pat. No. 6,149,723.
(60) Provisional application No. 60/093,680, filed on Jul. 22, 1998.

(51) Int. Cl.$^7$ .............................. C04B 14/10; C09C 1/42
(52) U.S. Cl. ........................ 106/486; 106/416; 106/484
(58) Field of Search ................................ 106/486, 416, 106/484; 501/144, 145

(56) References Cited

U.S. PATENT DOCUMENTS

| | | |
|---|---|---|
| 4,241,142 A | 12/1980 | Kaliski et al. |
| 4,943,324 A | 7/1990 | Bundy et al. |
| 5,085,707 A | 2/1992 | Bundy et al. |
| 5,128,606 A | 7/1992 | Gate et al. |
| 5,168,083 A | 12/1992 | Matthews et al. |
| 5,169,443 A | 12/1992 | Willis et al. |
| 5,411,587 A | 5/1995 | Willis et al. |
| 5,576,617 A | 11/1996 | Webb et al. |
| 5,624,488 A | 4/1997 | Forbus et al. |
| 5,645,635 A | 7/1997 | Behl et al. |
| 5,672,555 A | 9/1997 | Maxwell et al. |
| 5,749,958 A | 5/1998 | Behl et al. |
| 6,149,723 A | * 11/2000 | Pruett et al. ................. 106/486 |

* cited by examiner

*Primary Examiner*—Michael Marcheschi
(74) *Attorney, Agent, or Firm*—Finnegan, Henderson, Farabow, Garrett & Dunner

(57) ABSTRACT

Paper coating composition comprising an engineered kaolin pigment containing stacks and platelets of unground coarse particles where greater than 96% by weight is less than 5 microns, of which some kaolinite books or stacks are concentrated in the greater than 1 micron size fraction; 88% to 95% by weight is less than 2 microns; 65% to 85% by weight is less than 1 micron; and 15% to 25% by weight is less than 0.25 micron. A first embodiment comprises particles with a shape factor Ad between 7 and 9 which represents a significant number of stacks and some platelets. A second embodiment comprises particles with a shape factor of 11 or 12 which represents the presence of some stacks with a majority of platelets. The kaolin clay pigments form clay-water slurries of 69% solids or greater. As a coating, the composition gives a G. E. brightness between 88 and 94. The engineered pigment is processed so that the desired shape factor is met, which shape factor is equated to the aspect ratio or morphology of the pigment.

7 Claims, No Drawings

ENGINEERED KAOLIN PIGMENT COMPOSITION FOR PAPER COATING

This is a continuation of application Ser. No.09/359,532, filed Jul. 22, 1999, now U.S. Pat. No. 6,149,723, which claims the benefit of U.S. Provisional application Ser. No. 60/093,680, filed Jul. 22, 1998, all of which are incorporated herein by reference.

FIELD OF THE INVENTION

This invention relates to a composition of kaolin clay pigments especially useful for coated wood free or coated free sheet printed paper. In particular, the invention relates to a kaolin coating pigment composition comprising particles where (a) greater than 96% by weight is less than 5 microns; (b) about 88% to 95% by weight is less than 2 microns; and (c) about 150i to 25% by weight is less than 0.25 micron. This pigment contains some kaolin books or stacks concentrated in the greater than 1 micron size fraction; has a shape factor which correlates to the average particle aspect ratio ranging between 5 and 14; and can be made down with water into a slurry having a minimum of 69% solids.

BACKGROUND OF THE INVENTION

Kaolin clay pigments are obtained from kaolin. Kaolin, also known as china clay, is a type of rock that contains kaolin minerals. Kaolin minerals are hydrous alumina silicate clay minerals that include the minerals kaolinite, dickite, nacrite and halloysite. Primary kaolin deposits are formed in situ by weathering or hydrothermal alteration of feldspar or mica minerals contained in igneous or metamorphic rocks to kaolin minerals. Sedimentary kaolin deposits contain kaolin mineral-bearing sediments that were eroded and transported from a primary kaolin source rock, kaolin minerals resulting from the post-depositional alteration of feldspar- and mica-bearing sediments, or both. Commercially mined kaolins can contain some impurities such as clay-sized ferruginous or titaniferous impurities that impart an undesirable color to the kaolin clay. Some kaolin deposits contain impurities such as clay minerals of the smectite group that have an undesirable effect on the rheology of the kaolin. Most commercial kaolin deposits have coarse-grained sand to silt size impurities called "grit" that are generally above 45 microns. Grit particle impurities in a kaolin clay pigment used for paper coating may cause imperfections on the coated paper surface that resemble scratches or cause excessive wear of the paper coater blade by abrasion of metal surfaces in contact with the grit-bearing pigment.

The most common kaolin mineral is a naturally occurring hydrous alumina silicate known as kaolinite $(Al_2Si_2O_5(OH)_4)$. Kaolinite is the most common mineral in the kaolin clay widely used in the paper industry as fillers and/or coating pigments. Kaolin clays used for pigments are also called china clay or hydrous kaolin. Kaolinite particles occur over a range of sizes and a range of aspect ratios. The aspect ratio for kaolinite is defined as the diameter of a kaolin particle-divided by its thickness. Thus, a kaolin deposit mined commercially will generally not contain particles of a single size, such as, for example, particles all of which are 2 microns. Typically after minimum refining, a degritted kaolin will contain particles ranging in size from submicron or colloidal to particles 45 micrometers or larger.

Kaolin from different deposits, or even from different parts of the same deposit, can vary widely in the content of impurities, particle size distribution, as well as shape, or aspect ratio, of the kaolinite particles. In general, kaolinite particles smaller than about 1 micrometer occur as individual platelets. As the size of the kaolinite particles increase from about 1 micrometer, a larger proportion of the kaolinite particles occur as stacks or booklets of platelets as opposed to discrete individual platelets. Particle sizes of kaolin clay are conventionally determined by sedimentation using Stokes Law to convert settling rates to particle size distribution, and assume a spherical particle shape for the kaolin particles, hence, the use of the conventional term "equivalent spherical diameter (e.s.d.)" to designate particle size.

Kaolin clay pigments are widely used to coat and to fill paper products. It was formerly the practice to simply use relatively coarser size kaolins to fill papers and to employ finer size kaolins to coat paper. In paper, the coarser kaolin fillers functioned primarily as a pulp extender. When used to coat paper, the finer kaolin pigments improve brightness of the paper, provide a smooth, ink-receptive surface, and improve gloss with improved print quality and aesthetic appearance.

Kaolinite stacks or booklets can be mechanically delaminated. Delamination is generally known as the process of splitting kaolinite stacks or booklets, along a basal 001 cleavage or parting plane, into discrete platelets. One delaminating operation involves subjecting the naturally occurring kaolin stacks to shearing forces in an extruder, thereby reducing the kaolin stacks to discrete platelets. Another operation involves subjecting the naturally occurring kaolin stacks in an aqueous clay slurry to the cleaving or delaminating action of an attrition mill or a sand grinder. Reference may be made to U.S. Pat. No. 3,615,806 of Andrew Torock and Thomas F. Walsh for a thorough discussion of the process of delamination of kaolin clay. The kaolin pigments which have been delaminated can be used in paper coating to improve the opacity as well as enhance the smoothness of the paper surface. See for example, U.S. Pat. No. 3,171,718 to Gunn et al.

Kaolin clay can also be thermally structured through a calcination process which irreversibly converts the kaolinite into a material called "metakaolinite". Calcination causes the kaolin particles to stick or fuse together into porous aggregates and results in a pigment with higher light scattering caused by a higher index of refraction and a higher amount of light scattering surface than a kaolin which is not calcined.

Kaolin clay, hydrous kaolin, $(Al_2Si_2O_5(OH)_4)$ is white in color, has a fine particle size, and is relatively chemically inert, and, in addition to its low cost, makes it an ideal paper filler. Calcined (anhydrous) kaolin is also available for use as a filler and can impart greater opacity to paper than the hydrous kaolin. However, calcined kaolin has the serious disadvantage of being more abrasive than hydrous kaolin clays. Hydrous-and calcined kaolin clays are used to coat paper. However, calcined kaolin is generally used as a minor blend component in a coating pigment formulation because of its higher cost, poor glossing properties, and higher abrasion.

The purpose of paper coating is to cover an irregular paper surface comprised of cellulose wood fiber with a pigment-binder formulation, that when dry, leaves a smooth and brighter surface ready for printing. It is common practice to use kaolin clay along with other mineral pigments, such as titanium dioxide and calcium carbonates, as a coating in a coating formulation comprising starch and/or latex.

U.S. Pat. No. 4,241,142 to Kaliski, et. al. and assigned to Engelhard Minerals and Chemicals Corporation, discloses a novel clay pigment used in the production of dull and matte-finished coated printing papers. The novel clay pigment comprises a mixture of a coarse-size fraction of naturally-occurring kaolin clay containing a substantial proportion of kaolinite booklets in the particle size range of 2 to 5 microns e.s.d., and mechanically delaminated kaolin platelets in the particle size range of 2 to 10 microns.

A paper coating pigment comprising mechanically delaminated kaolin particles is disclosed in U.S. Pat. No. 5,169,443 to Willis, et al. and assigned to Engelhard Corporation. This pigment possesses the opacification, smoothness and printability advantages of conventional delaminated kaolin pigments but have desirably low viscosity and gloss not characteristic of conventional delaminated kaolin pigment. This pigment is designed for gravure and offset printed light-weight coated groundwood paper.

U.S. Pat. No. 2,992,936 to Rowland and assigned to Georgia Kaolin Company discloses an undelaminated and defined kaolin clay pigment with 10% to 15% of particles below 0.3 microns that provides improved brightness, opacity and gloss on coated paper.

U.S. Pat. No. 5,085,707 to Bundy et al. and assigned to Georgia Kaolin Company discloses a delaminated and defined kaolin clay pigment and its blend with a delaminated, No. 1 coating and No. 2 coating clays to obtain superior opacity, brightness and gloss on coated paper. This disclosure describes a standard engineered kaolin pigment sold commercially today.

Some coating formulations involve a combination of different types of kaolin pigments, such as a certain percentage of calcined kaolin clay and a certain percentage of hydrous kaolin clay, which combination can result in "poor" dispersion of particles in that the two types of kaolin clay pigments may aggregate, which may disrupt the coating structure, resulting in poor sheet optics, poor printability, or both. Additionally, many paper coating compositions comprise an abundance of fines, which tend to affect the optical properties of the sheet by improving gloss at the expense of sheet brightness for some grades and opacity.

Finally, kaolin clay pigments for coating are commonly shipped to paper mills as slurries by railroad tank cars, tanker trucks or in tank compartments on ships or barges. The shippable solids of a kaolin clay pigment slurry is dependent upon its fluidity at high solid levels both in terms of its low-shear viscosity that relates to how the slurry flows out of a tank and its high-shear viscosity that relates to how the slurry remains fluid as it passes through pumps and under the blade of the paper coating machine. Engineered pigments for coated freesheet applications such as Astra-Plus™ generally has a shippable pigment-water slurry solids close to 65%. Delaminated kaolin coating clays typically have a shippable pigment-water slurry solids below 68%. Standard No. 1 and No. 2 coating clays typically have a shippable pigment-water slurry solids of 70% or higher. There is an economic incentive to ship kaolin clay pigments at the highest possible solids to reduce the cost of shipping water with the pigment. Also, paper coating formulations for the coated freesheet market generally have a restrictive water balance to maintain quality and cost without adding expensive thickening agents into the formulation. It is also commonly theorized that higher coating solids improves surface coverage, that is the ability for pigment particles to cover the network of wood fibers and pores that form the surface of the paper basesheet. Therefore, paper coaters prefer pigment slurries shipped at the highest possible solids.

There is, therefore, a need in the industry for a fluid, low viscosity coating pigment for paper, particularly for wood free or free sheet paper, which provides for a highly glossy surface with good opacity and sheet brightness.

SUMMARY OF THE INVENTION

The present invention has met this need. The present invention provides a paper coating composition where the pigments are preferably comprised of one type of mineral, that is kaolinite ($Al_2Si_2O_5(OH)_4$), as opposed to a combination of kaolinite and calcined kaolin containing metakaolinite, mullite or spinel phases. The coating composition of the invention involves a kaolin pigment which is engineered to contain kaolinite stacks or books in the coarse particle size fraction of the pigment (greater than 1 micron) which provides sheet fill for macro smoothness and fluidity at higher clay-water slurry solids, and platy kaolinite particles that occupy the coarse and fine particle size fraction which forms a micro-smooth paper surface for good printability. The engineered kaolin pigment in the composition of the invention also comprises a paucity of fine particles below 0.25 micrometers which helps to enhance optical properties of the paper by creating pores in the coating structure which are optimally sized to scatter light. In theory, the coating composition of the invention provides kaolin stacks to fill the valleys or gaps between the fibers to obtain sheet smoothness, a paucity of fines to provide good opacity and sheet brightness, and platy particles to provide for a high gloss surface in proportions that provide for a surprising fluid clay-water slurry at 70% solids. The coating composition of the invention is preferably applicable to wood free or free sheet paper where high solids pigment slurries are desired.

To provide for a fluid clay-water slurry at 70% solids, several properties in the pigment are balanced to maintain performance of the engineered pigment on the coated sheet and maximize fluidity of the slurry. The properties that influence fluidity of a clay-water slurry are 5 and 2 micron contents, 0.25 micron content and particle aspect ratio. The less than 5 micron and less than 2 micron contents of the pigment are maximized to prevent scratching and poor sheet gloss of the coated paper surface caused by too many coarse particles and minimized to optimize particle packing which is essential for fluidity. The less than 0.25 micron content of the pigment is maximized to optimize particle packing while set to minimize the presence of fines that would fill voids or pores between larger pigment particles and cause loss of light scatter and coating opacity. The average aspect ratio or shape factor is minimized on the coarse side of the particle size distribution, by the presence of kaolinite stack and books, in order to minimize particle-particle contacts in a slurry under shear and is not controlled on the fine side of the particle size distribution in order to contribute to the glossing properties of the clay on the coated paper sheet.

The particle size distribution of the kaolin clay pigment in the composition of the invention is characterized in that greater than 96% by weight of the particles is less than 5 microns of which about 5% to about 50% by weight or by volume of the greater than 1 micron fraction are kaolinite books or stacks; between about 88% to about 95% by weight of the particles is less than 2 microns; between about 65% to about 85% by weight is less than 1 micron; and between about 15% to about 25% by weight of the particles is less than 0.25 microns.

The invention uses the shape factor of the kaolin pigment as a correlation of the average aspect ratio of particles in the kaolin pigment. Kaolinite stacks have a low particle aspect ratio that is generally less than 1. Books of kaolinite platelets in crystallographic union that represent fragments of broken stacks can have a low particle aspect ratio in the 1 to 8 range. Individual kaolinite plates have a higher particle aspect ratio that is generally greater than 8 and potentially exceeds 20. A first embodiment of the invention involves a kaolin clay pigment that has a shape factor equal to or less than 10, and preferably between about 7 and 9, which represents a significant number of stacks and books, and some platelets. A second embodiment of the invention involves a kaolin clay pigment that has a shape factor between 10 and 14, and preferably 11 or 12, which represents some stacks and books with a majority of plates.

The engineered kaolin clay pigment of the invention forms a clay-water slurry about equal to or greater than 70% solids. When the pigment is incorporated in a coating, the composition gives a G. E. brightness ranging from between 88 and 94, and a Hunter b-value below 3.5.

It is, therefore, an object of the present invention to provide a kaolin clay pigment used as a component of a coating composition for wood free and free sheet paper grades comprised of an engineered kaolin clay having a shape factor being less than 10 or not greater than 14 that functionally provides good sheet optics, good printability, or both to the coated paper.

It is a further object of the present invention to provide a kaolin clay pigment used as a component of a coating composition for free sheet and wood free paper grades consisting of an engineered kaolin clay with a particle morphology of kaolinite stacks, books and plates being greater than 1 micron.

It is a further object of the invention to engineer a kaolin pigment by using a shape factor measurement and using the value as a correlation to obtain the desired particle size distribution for the kaolin pigment.

These and other objects of the present invention will-be better appreciated and understood in reading the detailed description of the preferred embodiments.

DETAILED DESCRIPTION OF THE PREFERRED EMBODIMENTS

The pigment of the invention generally is produced from a coarse kaolin, preferably a sedimentary kaolin, such as a Cretaceous kaolin from Georgia, U.S.A. It may be characterized in that at least 80 wt. % is less than 2 microns, and the size fraction greater than 1 micron comprises an abundance of kaolinite stacks, books and some platelets, and the size fraction less than 1 micron comprises mostly kaolinite platelets.

The kaolin pigment of the invention is produced by wet processing an individual, or a blend, of sedimentary kaolin ore, where the dominant component is coarse kaolin ore containing kaolinite books or stacks, i.e. with a shape factor of the degritted crude below 15. The wet processing includes steps to alter particle size, such as subjecting the kaolin ore to sandboxes to remove sand and coarse silt particles, centrifugal classification to modify particle size distribution, including a defining step, and steps to refine the product to increase brightness and reduce the Hunter b-value as illustrated in Example 1 herein. These latter steps may include flotation, high intensity wet magnetic separation, selective flocculation and reduced acid leaching.

During the wet processing procedure, if the particle size is too high or too low, the kaolin clay is subjected to a defining or classification step to a degree such that the particle size is met. Particle size distribution can also be controlled by blending in portions of delaminated and defined kaolin clay as illustrated in Example 2 herein or by blending in portions of undelaminated and undefined kaolin clay as illustrated in Example 3 herein.

Preferably, the desired shape factor for the engineered kaolin pigment of the invention is less than 10, preferably between 7 and 9 for a first embodiment and between 10 and 14, preferably 11 to 12, for a second embodiment.

An "engineered kaolin pigment" can be defined as that pigment whose particle size distribution and/or shape is tailored to a certain paper coating application. This can be done through several grinding and/or classification steps. The engineered kaolin pigment of the invention also entails tailoring the morphology of the pigment which can include grinding, classifying and/or defining steps.

The invention uses a "shape factor" measurement which is equated to the morphology or aspect ratio of the pigment, and which morphology is characterized in the particle size distribution of the kaolin pigment.

The "shape factors" herein are those values obtained by a device owned by the assignee of the present invention which is described in U.S. Pat. Nos. 5,128,606 and 5,576,617. This device can be used to measure the change of the shape of the particle as the particle is being processed which may involve the particle being subjected to the several grinding and/or classification steps, or which may involve different kaolin process streams being combined.

Preferably, the kaolin clay pigment of the invention may be (1) defined and undelaminated (unground) particles with a shape factor less than 10; or (2) a blend of defined, delaminated particles and undelaminated particles with a shape factor ranging from about 10 to about 14. "Delamination" is a grinding step where kaolinite stacks (greater than 1 micron) or books are cleaved or separated into platelets. "Defining" is a process where a percentage of fine fraction of the kaolin suspension is separated and discarded from the product, and the remaining percentage is recycled in a clay producing circuit to produce a usable clay product. Both the delamination and the defining processes are known to those skilled in the art.

In the invention, the pigment composition, preferably, has a shape factor equal to or less than 10, and preferably 7 to 10 for a first embodiment; and a shape factor between 10 and 14, and preferably 11 to 12, for a second embodiment.

"Shape factor" is a measure of an average value of the ratio for a population of particles of varying size and shape as measured using the electrical conductivity method and apparatus described in the aforesaid U.S. Pat. No. 5,128,606 and using the equations derived in the patent specification of U.S. Pat. No. 5,128,606, the teachings of which are incorporated herein by reference along with the aforesaid U.S. Pat. No. 5,576,617.

Generally, if the shape factor is between 1 and 15, the kaolin clay contains a significant amount of low aspect ratio stacks or booklets with an e.s.d. of 1 to 5 microns or greater. This is considered as being "blocky". If the shape factor is between 15 and 30, the clay is composed substantially of individual thick platelets, which may be considered as being "platy". If the shape factor is above 30, the clay is composed of numerous thin platelets, which may be considered unacceptable for many practical commercial applications, such as coating for paper products where a fluid pigment at 70% slurry is required. As stated above, the shape factor for the pigments in the embodiments of the present invention is preferably 7 to 10 for the first embodiment, and preferably 11 to 12 for the second embodiment.

The particle size distribution for the kaolin clay pigment product of the invention is (a) >96% by weight is less than 5 microns of which about 5% to about 50% by weight or by volume are kaolinite books or stacks concentrated in the greater than 1 micron size fraction; (b) about 88% to about 95% by weight of the particles is less than 2 microns; (c) about 65% to about 85% by weight of the particles is less than 1 micron; and (d) about 15% to about 25% by weight of the particles is less than 0.25 microns.

The kaolin clay pigment for a coating composition of the first embodiment of the invention which is an undelaminated, defined clay having a shape factor less than 10, is a coarse Georgia U.S.A. crude, more about which will be discussed hereinbelow.

The kaolin clay pigment for a coating composition for the second embodiment of the invention which comprises a defined and delaminated clay combined with an undelaminated clay and having a shape factor of 11 or 12 is made by blending two process streams. The first process stream is a delaminated and defined clay used as a coating or a filler. This clay can be chemically treated and has a particle size distribution such that at least 70% of the kaolin particles have a particle size of at least 0.3 microns and less than 2 microns e.s.d. The second process stream is an undelaminated, undefined clay comprised of a relatively broad particle size kaolin, typically having about 82% to 84% by weight of particles less than 2 microns and about 30% to 35% by weight of particles less than 0.25 microns. The coarse portion of this second stream contains kaolin stacks.

The second embodiment of the invention can also be produced by blending defined and undelaminated kaolin clay of the first embodiment with unground and undefined kaolin.

Table 1 gives the physical properties of the products of the invention. ALPHACOTE™ represents a No. 1 high brightness coating clay product sold by ECC International. ASTRA-PLUS™ represents an engineered coating clay product sold by ECC International. Product No. 1 represents the clay product of the first embodiment (undelaminated, but defined clay). Product No. 2 represents a blended clay product of the second embodiment that is 75% delaminated and defined engineered clay blended with 25% No. 2 Coating clay containing stacks and books of kaolinite larger than 1 micron in diameter. Product No. 3 represents a blended clay product of the second embodiment that is 90% of Product No. 1 blended with 10% of No. 2 Coating clay containing stacks and books of kaolinite larger than 1 micron in diameter.

| Physical Property | ALPHACOTE ™ | ASTRA-PLUS ™ | Product No. 1 | Product No. 2 | Product No. 3 |
|---|---|---|---|---|---|
| Brightness | 90.2 | 89.7 | 91.1 | 89.5 | 90.8 |
| Hunter b | 2.3 | 2.7 | 1.4 | 2.4 | 2.6 |
| <5 Micron | 100 | 100 | 98 | 96 | 99 |
| <2 Micron | 93 | 97 | 90 | 91 | 90 |
| <1 Micron | 84 | 85 | 74 | 79 | 74 |
| <0.5 Micron | 68 | 52 | 49 | 52 | 50 |
| <0.25 Micron | 41 | 15 | 20 | 22 | 22 |
| Viscosity: | | | | | |
| % solids | 70 | 65 | 70 | 70 | 70 |
| Brookfield cps @ 20 rpm | 200 | 60 | 230 | 170 | 346 |
| Hercules Dynes | 18 | 18 | 18 | 18 | 18 |
| Hercules rpm | 1940 | 2300 | 240 | 340 | 385 |
| Shape Factor | N.D. | 7 | 12 | 11 | |

From the table, it can be seen that the three products (No. 1, No. 2, and No. 3) of the invention can be made into a water-clay slurry of 70% solids due to optimal design of particle size and particle shape distribution. The ASTRA-PLUS™ product, an engineered coating kaolin clay pigment that has good optical performance attributes in coatings on freesheet and woodfree paper, has a higher <2 micron particle size, lower <0.25 micron particle size content, and lower slurry solid relative to the three products of the invention. In contrast, the ALPHACOTE™ product, a high brightness coating kaolin clay with particle size distribution typical for a No. 1 Coating Clay, has a similar <2 micron particle size, much higher <0.25 micron particle size and similar slurry solids relative to the three products of the invention.

The prior art described in U.S. Pat. No. 5,085,707 to Bundy et al. shows that coating kaolin clay pigments such as No. 1 Coating clays with similar particles size distribution to the ALPHACOTE™ clay pigment have a poorer optical performance characteristics on coated paper relative to coating pigment formulations containing defined and delaminated engineered pigments similar to those claimed in U.S. Pat. No. 5,085,707 and typified by the ASTRA-PLUS™ clay pigment.

The undelaminated, defined kaolin clay of the first embodiment of the invention (Product No. 1 of Table 1) is obtained by blunging a Georgia, U.S.A. Cretaceous kaolin. This involves making the kaolin crude down into a slurry form by adding water and dispersing chemicals to achieve about 60% solids based on the weight of the slurry. The slurry is then degritted by passing the slurry through a +325 mesh screen to remove the coarse particles greater than 45 microns. The slurry is then subjected to a flotation process where the titanium minerals adhere to the collector and are floated out of the kaolin slurry. From the flotation cell, the slurry is carried through a Bird centrifuge where coarse particles, mostly greater than 2 microns are removed and the fine fraction is recovered as a product with 87% to 95% by weight of the particles being less than 2 microns. This stream is carried through a high intensity wet magnetic separator which removes the iron-bearing minerals from the clay. From the magnetic separator, the clay slurry is subjected to a defining step in a disc nozzle centrifuge, manufactured by Merco Manufacturing or by Alfa Laval Inc. of Fort Lee, N.J. The defining includes the operation of separating and recovering a portion of the kaolin clay having a reduced content of finer particle size kaolin material, in particular colloidal particle size material, that is kaolin particles having a particle size less than about 0.3 micron e.s.d.

The product can be further processed, such as bleached, ozoned, and dried or shipped in slurry form to the customer. The shape factor and particle size of this product is measured and, if the shape factor or particle size is not satisfactorily met for a desired final product, this intermediate product can be blended with a coarse or fine material, classified, or both in order to obtain a desired shape factor for a final kaolin product for a coating application. The final product kaolin clay can be made down to a 70% solids based on the weight of the clay-water slurry with good fluidity.

The kaolin clay product of the second embodiment of the present invention (Product No. 2 and Product No. 3) involves the blending or admixing of two process streams to produce the desired particle size distribution and shape factor of 11 or 12. The blended Product No. 2 comprises 75% of a defined and delaminated clay combined with 25% of an undelaminated clay product. The blended Product No. 3 is comprised of 90% of a defined and undelaminated clay component similar to Product No. 1 with about 10% of a undefined and undelaminated clay product, which is a No. 2 coating clay as discussed hereinabove.

Tables 2 and 3 present comparisons of the ASTRA-PLUS™ product a typical commercial engineered kaolin clay pigment having the make-down capability of a 65% solids clay-water slurry with Product Nos. 1, 2 and 3 of Table 1 having the make-down capability of a 70% solids clay-water slurry. Table 2 gives properties for Product No. 1 (first embodiment) and for Product No. 2 (second embodiment) in a paper coating comparison with the ASTRA-PLUS™ product. The coating color composition used to make the comparison in Table 2 includes 65 parts kaolin clay pigment, 25 parts precipitated calcium carbonate, 5 parts anatase titania pibment, 5 parts plastic pigment, 9 parts latex, 4 parts starch, and 1 part calcium stearate. The data in Table 2 show that Product Nos. 1 and 2 of the invention, having a lower 2 micron content and a higher 0.25 micron content relative to the ASTRA-PLUS™ product, have equal or better paper performance in terms of brightness, opacity and gloss.

Table 3 gives the properties for Product No. 3, the second embodiment, in a paper coating comparison against the ASTRA-PLUS™ product. The coating color composition used to make this comparison in Table 3 includes 59 parts kaolin clay pigment, 25 parts ground calcium carbonate with 0.7 micron mean particle size, 10 parts anatase titania pigment, 6 parts plastic pigment, 9.5 parts latex and 1.5 parts starch. Again, the data in Table 3 show that Product No. 3 of the invention, having a lower 2 micron content and a higher 0.25 micron content relative to the ASTRA-PLUS™ product, has equal or better paper performance in terms of brightness, opacity and gloss, and yields a sheet with similar roughness.

|  | ASTRA-PLUS ™ | Product No. 1 | Product No. 2 |
| --- | --- | --- | --- |
| Coating Wt., g/m² | 9.0 | 9.0 | 9.0 |
| Brightness ISO | 82.4 ± 0.26 | 83.2 ± 0.29 | 82.3 ± 0.32 |
| Hunter b | 1.64 | 1.11 | 1.47 |
| Opacity ISO | 93.8 ± 0.75 | 93.8 ± 0.75 | 93.6 ± 0.92 |
| Hagerty Porosity sec/2.5 ml Hg | 25.4 ± 3.93 | 27.3 ± 5.87 | 28.5 ± 6.93 |
| Sheet Gloss | 74.4 ± 2.18 | 75.1 ± 2.52 | 74.5 ± 2.87 |
| Print Gloss | 83.6 ± 2.23 | 82.2 ± 2.47 | 82.7 ± 3.06 |

|  | ASTRA-PLUS ™ | Product No. 3 |
| --- | --- | --- |
| Coating Wt., g/m² | 15.0 | 15.0 |
| Brightness ISO | 86.1 ± 0.07 | 86.6 ± 0.13 |
| Opacity ISO | 92.05 ± 0.35 | 91.88 ± 0.17 |

-continued

|  | ASTRA-PLUS ™ | Product No. 3 |
| --- | --- | --- |
| PPS Roughness, microns | 0.76 ± 0.02 | 0.77 ± 0.02 |
| Gurley Porosity sec @ 10 cc | 92.51 ± 8.07 | 100.50 ± 9.55 |
| Sheet Gloss | 78.28 ± 1.32 | 78.21 ± 0.91 |
| Print Gloss | 80.52 ± 1.35 | 81.30 ± 0.86 |

The clay pigment of the invention preferably is utilized to produce coating colors. For example, the kaolin clay pigment of this invention is added to a coating color as a 70% solids clay slurry with water containing a suitable amount of clay dispersant, such as sodium polyacrylate. Conventional clay binders (adhesives) may be used in the coating formulations comprising the kaolin pigment of the invention. Other pigments, such as plastic pigment, ground calcium carbonate, precipitated calcium carbonate, calcined kaolin clay or titanium dioxide, may also be added to the coating color to enhance certain properties of the coating or to reduce costs of the coating formulation.

The criteria for selecting clay binders and binder levels are known to those in the paper coating art. It is known that the binder system may affect printability, e.g., ink holdout and set-off depending on the printing ink that is used. A binder which minimizes ink set-off may be preferred. Recommended binders include, by way of example, polyvinyl acetate latexes, styrene-butadien latexes and mixtures thereof with starch or protein. Wood free or free sheet base stock preferably is used in the invention. The coated sheets preferably are produced by a calendering or supercalendering operation which is done in a conventional manner.

In utilizing the novel coating composition of the invention, the final clay product can be made down to a 70% solids slurry with water prior to adding it to the coating color formulation. When a coating color utilizing the novel coating composition of the invention is applied to the base stock in a conventional manner, the stacks and books of kaolinite generally fill the spaces between the wood fibers on the surface of the paper base stock to reduce macro-roughness of the paper, and the platelets act to bridge the fibers of the base stock to provide a smooth surface that yields good sheet gloss of the coated paper. Coating the paper is generally followed by a calendering or super calendering operation that further flattens or aligns the platy pigment particles on the coated paper surface to produce a free sheet or wood free paper product with a high gloss surface. The paucity of fines in the novel coating composition of the invention along with the larger low aspect ratio pigment particles forms a microporous network within the coating structure that acts to optimize light scattering and provides the coated sheet with good opacity and sheet brightness properties.

In a coating formulation, the kaolin clay product of the invention can be used as the only pigment, or it can be used with a ground calcium carbonate or a precipitated calcium carbonate or a combination of these calcium carbonates with the engineered clay of the invention. From the above, it can be seen that the engineered kaolin clay pigment of the invention is a product which in whole or in part comprises unground kaolin that contains a certain percentage of stacks and/or platelets.

While the present invention has been particularly set forth in terms of specific embodiments thereof, it will be understood in view of the instant disclosure that numerous variations upon the invention are now enabled to those. skilled in the art, which variations yet reside within the scope of the present invention. Accordingly, the invention is to be broadly construed and limited only by the scope and spirit of the claims now appended hereto.

What is claimed is:

1. A composition for a kaolin clay pigment for a coating application on paper, said kaolin clay pigment comprising:

kaolin clay particles having a particle size distribution characterized as (a) more than 96% by weight of the kaolin clay particles are finer than 5 microns of which about 5% to about 50% by weight or by volume are kaolinite stacks or books concentrated in the greater than 1 micron size fraction; (b) about 88% to about 95% by weight of the kaolin particles are finer than 2 microns; (c) about 65% to about 85% by weight of the kaolin particles are finer than 1 micron; and (d) about 15% to about 25% of the kaolin particles are finer than 0.25 micron.

2. A coated paper comprising a substrate and a coating comprising the kaolin clay pigment according to claim 1.

3. The coated paper of claim 2, wherein kaolin clay pigment used in the coating has a shape factor of less than 14.

4. The coated paper of claim 3, wherein kaolin clay pigment used in the coating has a shape factor of less than 10.

5. The coated paper of claim 4, wherein the kaolin clay pigment comprises a blend of defined, delaiminated particles and undefined, undelaminated particles.

6. The coated paper of claim 5, wherein the undefined, undelaminated particles are present in an amount less than about 30% of the kaolin clay pigment.

7. The coated paper of claim 2, wherein the coating is a slurry having a solids content of at least 69%.

* * * * *

UNITED STATES PATENT AND TRADEMARK OFFICE
CERTIFICATE OF CORRECTION

PATENT NO.   : 6,468,343 B1
DATED        : October 22, 2002
INVENTOR(S)  : Pruett et al.

It is certified that error appears in the above-identified patent and that said Letters Patent is hereby corrected as shown below:

<u>Title page,</u>
Item [57], ABSTRACT,
Line 9, delete the word "Ad".

Signed and Sealed this

Eighteenth Day of March, 2003

JAMES E. ROGAN
*Director of the United States Patent and Trademark Office*